US012743585B2

(12) United States Patent
Coffrant

(10) Patent No.: US 12,743,585 B2
(45) Date of Patent: Sep. 22, 2026

(54) SYSTEM AND METHOD FOR RECOGNIZING SENTIMENT OF USER'S FEEDBACK

(71) Applicant: GRABTAXI HOLDINGS PTE. LTD., Singapore (SG)

(72) Inventor: Christian Michel Coffrant, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 221 days.

(21) Appl. No.: 18/698,225

(22) PCT Filed: Oct. 14, 2022

(86) PCT No.: PCT/SG2022/050734
§ 371 (c)(1),
(2) Date: Apr. 3, 2024

(87) PCT Pub. No.: WO2023/069017
PCT Pub. Date: Apr. 27, 2023

(65) Prior Publication Data

US 2025/0232120 A1 Jul. 17, 2025

(30) Foreign Application Priority Data

Oct. 19, 2021 (SG) ............................ 10202111598X

(51) Int. Cl.
*G06F 40/30* (2020.01)
*G06N 3/0499* (2023.01)

(52) U.S. Cl.
CPC ........... *G06F 40/30* (2020.01); *G06N 3/0499* (2023.01)

(58) Field of Classification Search
USPC ...................................................... 704/1–504
See application file for complete search history.

(56) References Cited

U.S. PATENT DOCUMENTS 10,540,446 B2 * 1/2020 DeFelice ................ G06N 3/047
11,582,093 B2 * 2/2023 Savalle ................. H04L 67/125
(Continued)

FOREIGN PATENT DOCUMENTS

CN 108363753 A 8/2018
CN 111930940 A 11/2020
(Continued)

OTHER PUBLICATIONS

International Search Report and Written Opinion dated Apr. 24, 2023 which was issued in connection with PCT/SG2022/050734.
(Continued)

*Primary Examiner* — Marcus T Riley
(74) *Attorney, Agent, or Firm* — Maschoff Brennan

(57) ABSTRACT

According to various embodiments, a system for recognizing a sentiment of a user's feedback is provided. The system comprises: an encoder configured to receive an input text for the user's feedback, break up the input text into text tokens, and encode each text token; and a decoder connected to the encoder and configured to output a sentiment score for the input text, wherein the encoder is further configured to read the encoded text token in a bidirectional manner to obtain a forward node value and a backward node value, and concatenate the forward node value and the backward node value together to obtain a vector representing semantic meaning of the input text, and the decoder is configured to receive the vector from the encoder, obtain a probability of each sentiment score by mapping the vector into each sentiment score, and determine the sentiment score for the input text based on the probability.

20 Claims, 3 Drawing Sheets

(56) References Cited

U.S. PATENT DOCUMENTS

| | | | | |
|---|---|---|---|---|
| 11,600,263 | B1 * | 3/2023 | Blair | G06T 1/00 |
| 11,645,947 | B1 * | 5/2023 | Blair | G10L 15/18 704/275 |
| 12,117,838 | B1 * | 10/2024 | Sigurdsson | G10L 15/22 |
| 2019/0236139 | A1 * | 8/2019 | DeFelice | G06N 3/0455 |
| 2019/0236148 | A1 * | 8/2019 | DeFelice | G06N 3/006 |
| 2020/0043480 | A1 * | 2/2020 | Shen | G10L 15/22 |
| 2020/0104369 | A1 * | 4/2020 | Bellegarda | G06F 40/30 |
| 2020/0151396 | A1 * | 5/2020 | DeFelice | G06N 3/084 |
| 2021/0073459 | A1 * | 3/2021 | McCann | G06F 40/126 |
| 2021/0192143 | A1 * | 6/2021 | DeFelice | G06N 7/01 |
| 2024/0028834 | A1 * | 1/2024 | DeFelice | G06N 3/0475 |
| 2025/0232120 | A1 * | 7/2025 | Coffrant | G06N 3/0455 |
| 2025/0307927 | A1 * | 10/2025 | Galvin | G06N 3/045 |

FOREIGN PATENT DOCUMENTS

| | | | | | |
|---|---|---|---|---|---|
| CN | 112560495 | A | | 3/2024 | |
| CN | 118119944 | A | * | 5/2024 | G06N 3/0499 |
| KR | 10-2022-0096994 | A | | 7/2022 | |
| WO | WO-2023069017 | A2 | * | 4/2023 | G06N 3/0499 |

OTHER PUBLICATIONS

Li H. et al., CTAL: Pre-training Cross-modal Transformer for Audio-and-Language Representations. arXiv preprint arXiv:2109.00181, Sep. 1, 2021 [Retrieved on Apr. 20, 2023] <DOI: 10.48550/ARXIV.2109.00181 > Section 3.1.1 Input embeddings.

Garg K. D. et al., Handling Unknown Words in Neural Machine Translation System. 2020 International Conference on Decision Aid Sciences and Application, Nov. 9, 2020, pp. 1077-1081 [Retrieved on Apr. 20, 2023] <DOI: 10.1109/DASA51403.2020.9317169> Section I1.B Byte Pair Encoding [Retrieved from: https://www.researchgate.net/publication/348539291_Handling_Unknown_Words_in_Neural_Machine_Translation_System].

Chia Y. K. et al., Transformer to CNN: Label-scarce distillation for efficient text classification. arXiv preprint arXiv:1909.03508, Sep. 8, 2019 [Retrieved on Apr. 20, 2023] <DOI: 10.48550/ARXIV.1909.03508> Section 2 second paragraph.

* cited by examiner

SYSTEM AND METHOD FOR RECOGNIZING SENTIMENT OF USER'S FEEDBACK

This application is a US National Stage application pursuant to 35 USC 371 claiming benefit of and priority to International Application No. PCT/SG2022/050734, filed on Oct. 14, 2022, and claiming priority to Singapore Application No. 10202111598X filed on Oct. 19, 2021, each of which are hereby incorporated by reference in their entirety.

TECHNICAL FIELD

Various embodiments relate to a system and a method for recognizing a sentiment of a user's feedback.

BACKGROUND

To improve a quality of company's products or services, the companies may collect customer's feedbacks about their experiences with and expectations for the company's products or services. The companies may provide a space for the customers to leave their feedbacks, and the customers may leave their feedbacks on the space. For example, a customer may access an application program or a webpage operated by a company and leave a text feedback about the company's service or product.

However, while the customer leaves the text feedback via the application program or the webpage, the customer typically does not interact with a live person from the company. Therefore, the company may not know how the customer feels about the company's service or product, for example, a sentiment or an emotion of the customer's feedback. In particular, it may be difficult for the company to understand the sentiment or the emotion of the foreign customers' feedback written in the wide variety of languages.

SUMMARY

According to various embodiments, a system for recognizing sentiment of user's feedback is provided. The system comprises: an encoder configured to receive an input text for the user's feedback, break up the input text into text tokens, and encode each text token; and a decoder connected to the encoder and configured to output a sentiment score for the input text. The encoder is further configured to read the encoded text token in a bidirectional manner to obtain a forward node value and a backward node value, and concatenate the forward node value and the backward node value together to obtain a vector representing semantic meaning of the input text. The decoder is configured to receive the vector from the encoder, obtain a probability of each sentiment score by mapping the vector into each sentiment score, and determine the sentiment score for the input text based on the probability.

In some embodiments, the input text relates to a sentence, and the encoder is configured to break up the input text into the text tokens each corresponding to a plurality of words included in the sentence.

In some embodiments, the encoder is further configured to input the encoded text token into a Bidirectional Long Short-Term Memory Network (Bi-LSTM) model configured to read the encoded text token in the bidirectional manner.

In some embodiments, the encoder comprises a series of Bi-LSTM layers in which the Bi-LSTM model is operated. In a first Bi-LSTM layer of the Bi-LSTM layers, the encoder is configured to input the encoded text token into the Bi-LSTM model, and the Bi-LSTM model is configured to obtain a first forward node value and a first backward node value and concatenate the first forward node value and the first backward node value together. In a next Bi-LSTM layer of the Bi-LSTM layers, the encoder is configured to input the concatenated first forward node value and first backward node value into the Bi-LSTM model, and the Bi-LSTM model is configured to obtain a next forward node value and a next backward node value and concatenate the next forward node value and the next backward node value together.

In some embodiments, the encoder comprises a max pooling layer in which a max pooling function is operated. In a final Bi-LSTM layer of the Bi-LSTM layers, the Bi-LSTM model is configured to obtain a final forward node value and a final backward node value, and concatenate the final forward node value and the final backward node value together. In the max pooling layer, the max pooling function is configured to process the concatenated final forward node value and final backward node value to obtain the vector.

In some embodiments, the encoder is further configured to encode the each text token using a Byte Pair Encoding model.

In some embodiments, the encoder is further configured to encode a stop token representing an end of the input text using the Byte Pair Encoding model, and input the encoded stop token into the Bi-LSTM model.

In some embodiments, the decoder is configured to input the vector into a Feedforward Neural Network (FFNN) model configured to map the vector to the each sentiment score.

In some embodiments, the decoder comprises a series of FFNN layers in which the FFNN model is operated, and a Softmax layer in which a Softmax function is operated. The decoder is configured to input the vector into the FFNN model in the series of FFNN layers to obtain an output, and input the output of the FFNN model into the Softmax function. The Softmax function is configured to obtain the probability of the each sentiment score and determine the sentiment score for the input text based on the probability.

In accordance with various embodiments, there is a method of recognizing a sentiment of a user's feedback. The method includes: receiving an input text for the user's feedback; breaking up the input text into text tokens; encoding each text token; reading the encoded text token in a bidirectional manner to obtain a forward node value and a backward node value; concatenating the forward node value and the backward node value together to obtain a vector representing semantic meaning of the input text; obtaining a probability of each sentiment score by mapping the vector into each sentiment score; and determining a sentiment score for the input text based on the probability.

In some embodiments, the input text relates to a sentence, and breaking up the input text into text tokens includes: breaking up the input text into the text tokens each corresponding to a plurality of words included in the sentence.

In some embodiments, reading the encoded text token in a bidirectional manner to obtain a forward node value and a backward node value includes: inputting the encoded text token into a Bidirectional Long Short-Term Memory Network (Bi-LSTM) model configured to read the encoded text token in the bidirectional manner.

In some embodiments, the Bi-LSTM model is operated in a series of Bi-LSTM layers. Reading the encoded text token in a bidirectional manner to obtain a forward node value and a backward node value includes: inputting the encoded text token into the Bi-LSTM model in a first Bi-LSTM layer of the Bi-LSTM layers; obtaining a first forward node value and a first backward node value; concatenating the first forward node value and the first backward node value together; inputting the concatenated first forward node value and first backward node value into the Bi-LSTM model in a next Bi-LSTM layer of the Bi-LSTM layers; obtaining a next forward node value and a next backward node value; and concatenating the next forward node value and the next backward node value together.

In some embodiments, a max pooling function is operated in a max pooling layer. Reading the encoded text token in a bidirectional manner to obtain a forward node value and a backward node value further includes: obtaining a final forward node value and a final backward node value in a final Bi-LSTM layer of the Bi-LSTM layers; concatenating the final forward node value and the final backward node value together in the final Bi-LSTM layer of the Bi-LSTM layers; processing the concatenated final forward node value and final backward node value in the max pooling layer; and obtaining the vector in the max pooling layer.

In some embodiments, encoding each text token includes: encoding the each text token using a Byte Pair Encoding model.

In some embodiments, the method further includes: encoding a stop token representing an end of the input text using the Byte Pair Encoding model; and inputting the encoded stop token into the Bi-LSTM model.

In some embodiments, obtaining a probability of each sentiment score by mapping the vector into each sentiment score includes: inputting the vector into a Feedforward Neural Network (FFNN) model configured to map the vector to the each sentiment score.

In some embodiments, the FFNN model is operated in a series of FFNN layers, and a Softmax function is operated in a Softmax layer. Obtaining a probability of each sentiment score by mapping the vector into each sentiment score includes: inputting the vector into the FFNN model to obtain an output in the series of FFNN layers; inputting the output of the FFNN model into the Softmax function in the Softmax layer; obtaining the probability of the each sentiment score in the Softmax layer; and determining the sentiment score for the input text based on the probability in the Softmax layer.

According to various embodiments, a data processing apparatus configured to perform the method of any one of the above embodiments is provided.

According to various embodiments, a computer program element comprising program instructions, which, when executed by one or more processors, cause the one or more processors to perform the method of any one of the above embodiments is provided.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of a system and a method are analogously valid for the other system and method. Similarly, embodiments described in the context of a system are analogously valid for a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

Figure 1:
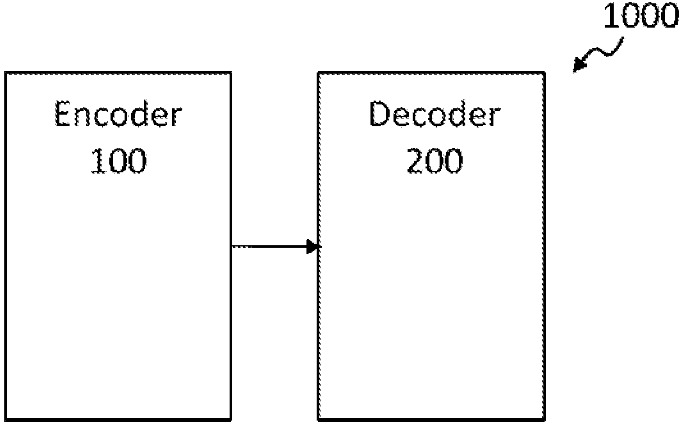
FIG. 1 shows a block diagram for a system for recognizing a sentiment of a user's feedback according to various embodiments.

FIG. 1 shows a block diagram for a system 1000 for recognizing a sentiment of a user's feedback according to various embodiments.

The system 1000 may be a set of interacting elements. The elements may be, by way of example and not of limitation, one or more mechanical components, one or more electrical components, and/or one or more instructions, for example, encoded in a storage media.

As shown in FIG. 1, the system 1000 may include an encoder 100 and a decoder 200. The encoder 100 may convert information, for example, an input text, into another format. The decoder 200 may process the another format of the information and output a sentiment score for the input text. In some embodiments, the encoder 100 and the decoder 200 may be connected to each other. For example, the encoder 100 and the decoder 200 may be connected to each other via at least one middle element. As another example, the encoder 100 and the decoder 200 may be directly coupled to each other.

In some embodiments, the encoder 100 and the decoder 200 may be mounted on a single device. For example, the encoder 100 and the decoder 200 may be mounted on different processors of a single device. As another example, the encoder 100 and the decoder 200 may be mounted on a single processor of the single device, for example, as program instructions. In some other embodiments, the encoder 100 and the decoder 200 may be mounted on different devices. The encoder 100 and the decoder 200 may be capable of data communication.

In some embodiments, at least one of the encoder 100 and the decoder 200 may include a microprocessor, an analogue circuit, a digital circuit, a mixed-signal circuit, a logic circuit, an integrated circuit, a Central Processing Unit (CPU), a Graphics Processing Unit (GPU), a Digital Signal Processor (DSP), a Field Programmable Gate Array (FPGA), an Application Specific Integrated Circuit (ASIC), etc., or any combination thereof. Any other kind of implementation of the respective functions, which will be described below in further detail, may also be understood as the at least one of the encoder 100 and the decoder 200.

In some other embodiments, the processor in which at least one of the encoder 100 and the decoder 200 is mounted may include a microprocessor, an analogue circuit, a digital circuit, a mixed-signal circuit, a logic circuit, an integrated circuit, a Central Processing Unit (CPU), a Graphics Processing Unit (GPU), a Digital Signal Processor (DSP), a Field Programmable Gate Array (FPGA), an Application Specific Integrated Circuit (ASIC), etc. or any combination thereof. Any other kind of implementation of the respective functions, which will be described below in further detail, may also be understood as the processor.

In some embodiments, the system 1000 may further include a memory (not shown). The memory may be used by the encoder 100 and the decoder 200 to permanently or temporarily store data. The memory may include, but not be limited to, a cloud memory, a server memory, and a physical storage, for example a RAM (random-access memory), an HDD (hard disk drive), an SSD (solid-state drive), others, or any combinations thereof.

In accordance with various embodiments, the encoder 100 may receive the input text for a feedback from a customer (hereinafter, referred to as a "user"). In some embodiments, the system 1000 may further include an input device (not shown). In some embodiments, the input device and the encoder 100 may be mounted on the same device. In some other embodiments, the input device and the encoder 100 may be mounted on different devices. For example, the input device may be mounted in a client device (also referred to as a "user's device"). The input device and the encoder 100 may be capable of data communication. The client device may include, but not be limited to, a mobile phone, a tablet computer, a laptop computer, a desktop computer, a smart watch, smart glasses, a television, a navigation device, a PDA (Personal Digital Assistant) and a PMP (Portable Multimedia Player).

In some embodiments, the input device may receive the input text relating to the feedback for a company's products and/or services from the user. The input text may include string of words constructing a sentence that the user may input. For example, the input text may include the string of words constructing the sentence that the user may type into a feedback box of an application program or a webpage operated by the company.

In some embodiments, the encoder 100 may break up the input text into text tokens. For example, the encoder 100 may break up the input text into the text tokens each corresponding to a plurality of words included in the sentence that the user may type. In some embodiments, the encoder 100 may break up the input text into text tokens by tokenizing the input text. The encoder 100 may tokenize the input text using a tokenizer, for example, Moses Tokenizer, to separate punctuation from the words while preserving special tokens such as dates.

In some embodiments, the encoder 100 may encode each text token. For example, the encoder 100 may encode the each text token using a Byte Pair Encoding model in which the most common pair of consecutive bytes of the text token is replaced with a byte which does not occur within the text token. In this manner, the each text token may be compressed.

In some embodiments, the encoder 100 may read the encoded text token in a bidirectional manner to obtain a forward node value and a backward node value. The encoder 100 may then concatenate the forward node value and the backward node value together, to obtain a vector representing semantic meaning of the input text. As an example, the encoder 100 may input the encoded text token into an autoencoder, for example, Bidirectional Long Short-Term Memory Network (Bi-LSTM) model which is configured to read the encoded text token in the bidirectional manner. The Bi-LSTM model may be a sequence processing model including two LSTMs. The Bi-LSTM model may read the encoded text token in a forward direction and in a backwards direction, and obtain the forward node value and the backward node value respectively.

In some embodiments, the encoder 100 may comprise a series of Bi-LSTM layers, for example, a first Bi-LSTM layer, a next Bi-LSTM layer, etc. The encoder 100 may input the encoded text token into the Bi-LSTM model in the first Bi-LSTM layer. The Bi-LSTM model may obtain a first forward node value and a first backward node value by reading the encoded text token in the forward direction and in the backward direction respectively in the first Bi-LSTM layer. The Bi-LSTM model may concatenate the first forward node value and the first backward node value together in the first Bi-LSTM layer.

In some embodiments, the encoder 100 may then input the concatenated first forward node value and first backward node value into the Bi-LSTM model in the next Bi-LSTM layer positioned after the first Bi-LSTM layer. The Bi-LSTM model may obtain a next forward node value and a next backward node value by reading the concatenated first forward node value and first backward node value in the forward direction and in the backward direction respectively in the next Bi-LSTM layer. The Bi-LSTM model may concatenate the next forward node value and the next backward node value together in the next Bi-LSTM layer. In some embodiments, these operations described herein may be repeated until a final Bi-LSTM layer of the Bi-LSTM layers is reached.

In some embodiments, the encoder 100 may include a max pooling layer in which a max pooling function is operated. The max pooling layer may be positioned after the final Bi-LSTM layer of the Bi-LSTM layers. In some embodiments, the Bi-LSTM model in the final Bi-LSTM layer may obtain a final forward node value and a final backward node value. The Bi-LSTM model in the final Bi-LSTM layer may concatenate the final forward node value and the final backward node value together. The max pooling function may then process the concatenated final forward node value and final backward node value in the max pooling layer, and obtain a vector including the set of values corresponding to each text token. In this regard, the encoder 100 may output the vector.

In some embodiments, the encoder 100 may encode a stop token representing the end of the input text using the Byte Pair Encoding model. The encoder 100 may input the encoded stop token into the Bi-LSTM model. For example, the set of values constructing the vector may also include a value corresponding to the stop token.

In some embodiments, the decoder 200 may output the sentiment score for the input text. The decoder 200 may receive the vector from the encoder 100 as an input. The decoder 200 may obtain a probability of each sentiment score by mapping the vector into each sentiment score, and determine the sentiment score for the input text based on the probability.

In some embodiments, the decoder 200 may input the vector into a Feedforward Neural Network (FFNN) model which is configured to map the vector to the each sentiment score. The FFNN model may be an artificial neural network in which connections between layers do not form a cycle and data moves in one direction, for example a forward direction, from an input layer to an output layer through one or more hidden layers.

In some embodiments, the decoder 200 may include a series of FFNN layers, for example, a first layer as an input layer of the decoder 200, and one or more hidden layers including a final layer.

In some embodiments, the decoder 200 may include a Softmax layer in which a Softmax function is operated. The Softmax layer may be positioned after the final layer of the FFNN layers. The Softmax function is configured to generalize the output of the final FFNN layer. The decoder 200 may input the vector into the FFNN model in the series of FFNN layers to obtain an output. The decoder 200 may then input the output of the series of FFNN layers into the Softmax function. The Softmax function in the Softmax layer may obtain the probability of the each sentiment score, and determine the sentiment score for the input text based on the probability.

It may be appreciated that the sentiment score obtained by the decoder 200 may be a polarity score, as opposed to a binary positive/negative score, for the sentiment of the user's feedback. As such, the company may correctly understand how the user feels about the company's product or service, from the user's feedback.

In some embodiments, the FFNN model may be trained to correctly map the vector to the each sentiment score. The FFNN model may be trained on a synthetic data set. The training data may include a sentence embedding, in the form of the vector, generated by the Bi-LSTM model of the encoder 100 and a corresponding sentiment score (for example, a sentiment score of the input text used to generate the sentence embedding).

To generate a polarity score, as opposed to a binary positive/negative score, for the sentiment of the user's feedback, a large volume of labelled training data may be needed to train the FFNN model. The system 1000 in accordance with various embodiments may create synthetic sentiment labels, to avoid having to manually label the training data.

In some embodiments, to create the synthetic sentiment labels, the system 1000 may use a rating, for example, a star rating, received from a user as a weak proxy for a sentiment score. The system 1000 may additionally use a sentiment score for a user's text feedback obtained from another sentiment analysis model, for example, off the shelf sentiment analysis model, as a weak proxy for the sentiment of the user's text feedback. One of examples of the off the shelf sentiment analysis model may be VADER (Valence Aware Dictionary and Sentiment Reasoner). In instances where there is an agreement in the rating and the sentiment score, the system 1000 may take the two (2) weak proxies and combine them to create a strong proxy. The strong proxy may be used to train the FFNN model of the system 1000. By using the synthetic sentiment label to generate training and validation data, huge amount of data may be programmatically labelled, and it may not be required to manually label the huge amount of data which may be costly and time consuming.

In some embodiments, the FFNN model may be trained on data of a certain language, for example, English data. After the FFNN model is trained on the English data, the system 1000 may input data in other languages, for example, non-English data. After obtaining the weak predictions, for example, a predicted sentiment score and the rating of the user, regarding the non-English data, the system 1000 may look for instances where the predicted sentiment score is matched with the rating of the user and use the predicted sentiment score as a synthetic sentiment label. The system 1000 may combine the two (2) weak proxies, for example, the predicted sentiment score and the rating of the user, together to form a strong proxy. Then, the FFNN model may further be trained on the new non-English data.

As described above, to initially create the synthetic sentiment label, the off the shelf model, for example, the VADER, and the rating of the user may be used. When there is an agreement between the rating and the sentiment score of the VADER, the system 1000 may use the sentiment score as the synthetic sentiment label. For example, this may be done for English data. As an example, for non-English data, the system 1000 may use a newly trained model, for example, taking the output of the decoder 200, and combine the output with the rating of the user to obtain the synthetic sentiment label for the non-English data.

In some embodiments, the text feedback may be inputted, a sentence embedding for the inputted text feedback may be generated using the encoder 100, and the sentence embedding may be inputted into the decoder 200. Parameters of the decoder 200 including the FFNN model may be updated each time when the decoder 200 makes an error on the training data. After certain rounds of training, the decoder 200 may be tested on a validation data set to check an accuracy of the decoder 200. As described above, the synthetic sentiment label may be used for training and validation of the system 1000.

Figure 2:
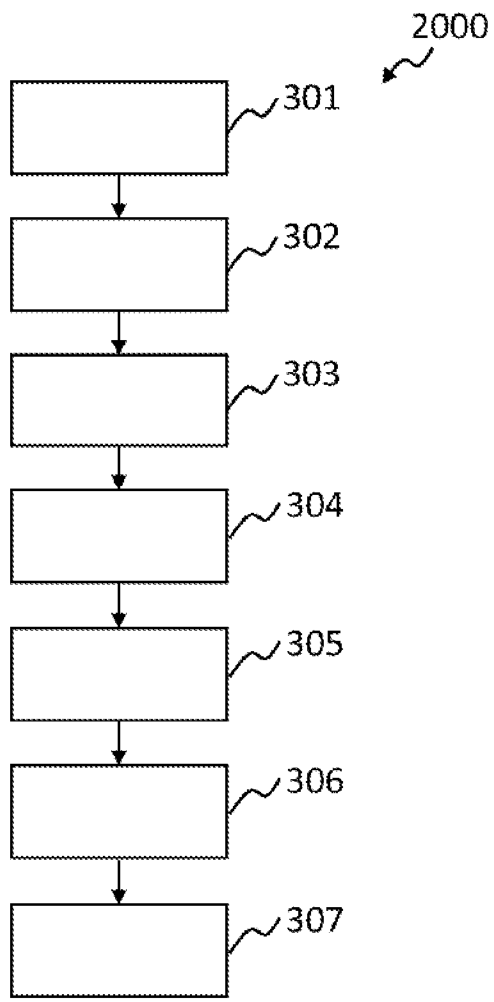
FIG. 2 shows an exemplary flowchart for a method of recognizing a sentiment of a user's feedback according to various embodiments.

FIG. 2 shows an exemplary flowchart for a method 2000 of recognizing a sentiment of a user's feedback according to various embodiments. According to various embodiments, the method 2000 of recognizing the sentiment of the user's feedback may be provided.

In some embodiments, the method 2000 may include a step 301 of receiving an input text for the user's feedback. For example, the input text may include string of words constructing a sentence that the user may input.

In some embodiments, the method 2000 may include a step 302 of breaking up the input text into text tokens. For example, the input text may be tokenized into the text tokens using a tokenizer, for example, Moses Tokenizer.

In some embodiments, the method 2000 may include a step 303 of encoding each text token. For example, each text token may be encoded using a Byte Pair Encoding model.

In some embodiments, the method 2000 may include a step 304 of reading the encoded text token in a bidirectional manner to obtain a forward node value and a backward node value. As an example, each encoded text token may be inputted into a Bidirectional Long Short-Term Memory Network (Bi-LSTM) model which is configured to read each encoded text token in a bidirectional manner. The forward node value and the backward node value for each text token may be obtained by the Bi-LSTM model in a series of Bi-LSTM layers.

In some embodiments, the method 2000 may include a step 305 of concatenating the forward node value and the backward node value together to obtain a vector representing semantic meaning of the input text. For example, the forward node value and the backward node value may be concatenated by the Bi-LSTM model in a final Bi-LSTM layer and the concatenated forward node value and the backward node value may be provided to a max pooling layer. The concatenated forward node value and the backward node value may be processed to obtain the vector including a set of values corresponding to each text token.

In some embodiments, the method 2000 may include a step 306 of obtaining a probability of each sentiment score by mapping the vector into each sentiment score. For example, the vector may be inputted into a Feedforward Neural Network (FFNN) model configured to map the vector to the each sentiment score. The probability of each sentiment score may be obtained by the FFNN model.

In some embodiments, the method 2000 may include a step 307 of determining a sentiment score for the input text based on the probability. For example, one of sentiment scores which has the highest probability may be determined as the sentiment score for the input text.

In this manner, in accordance with various embodiments, the method 2000 may provide a polarity score for the sentiment of the user's feedback, as opposed to a simple binary positive/negative score. As such, a company may correctly understand how the user feels about the company's product or service, from the user's feedback. In addition, in accordance with various embodiments, the method 2000 may perform a sentence embedding in the form of the vector in a language-agnostic way, for example, by using the Bi-LSTM model. Therefore, the company may correctly understand how the user feels about the company's product or service, from the user's feedback written in wide variety of languages.

Figure 3:
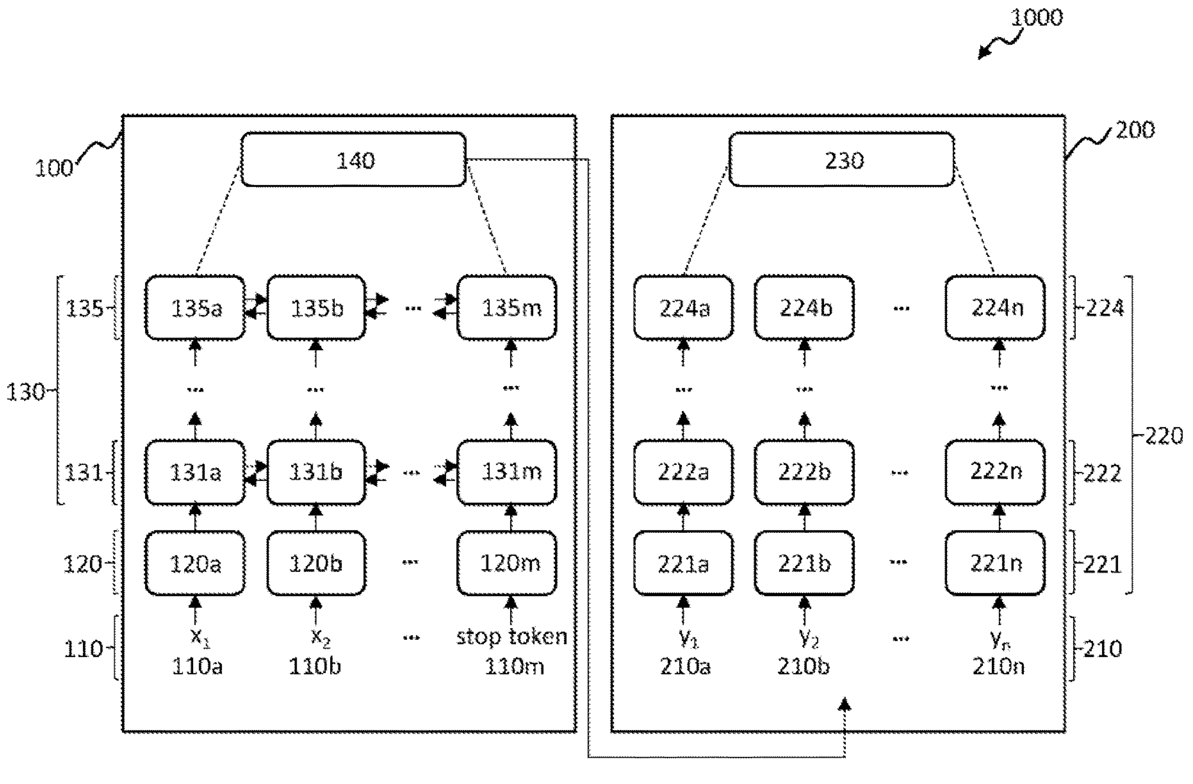
FIG. 3 shows an exemplary diagram for a system for recognizing a sentiment of a user's feedback according to various embodiments.

FIG. 3 shows an exemplary diagram for a system 1000 for recognizing a sentiment of a user's feedback according to various embodiments.

As shown in FIG. 3, the system 1000 may include an encoder 100 and a decoder 200 which are connected to each other. The encoder 100 may take an input text relating to a sentence, and output a sentence embedding in the form of a vector. The decoder 200 may take the output of the encoder 100 (i.e. the sentence embedding in the form of the vector) as its input, and output a sentiment score as a sentiment prediction for the input text.

To perform semantic level analysis, the system 1000 may use a technique capable of encoding the input text into the sentence embedding in a language-agnostic way. For the language-agnostic way, a Bidirectional Long Short-Term Memory Network (Bi-LSTM) model trained on a multi-language training set may be used in the encoder 100. The Bi-LSTM model may be scaled across multiple languages, and is capable of operating at a semantic level as opposed to a syntactic level.

In some embodiments, an input to the Bi-LSTM model may be a piece of the input text. As shown in FIG. 3, each word in the sentence of the input text may be represented by $X_n$ where n is a position of the word in the sentence. The word may be converted to a Byte Pair Encoding. The encodings may then be inputted into the Bi-LSTM model. The output of a final layer of the encoder 100 may be pooled together. For example, a size of the pooled layer may be 1024 dimensions. The 1024-dimension layer may contain the embedding for the input text as the output of the encoder 100.

In some embodiments, the sentiment analysis of the system 1000 may be performed at a word level. The encoder 100 may break up the input text into text tokens 110 each corresponding to a plurality of words included in the sentence using a tokenizer, for example, Moses Tokenizer. As an example, the input text for the sentence including two words may be tokenized into two text tokens (hereinafter, referred to as "a first text token 110*a*" and "a second text token 110*b*"). Although not shown, if the input text for the sentence includes a plurality of words, the input text may be tokenized into the plurality of text tokens.

In some embodiments, the encoder 100 may include an input layer 120. A Byte Pair Encoding model may operate in the input layer 120. In the input layer 120, the encoder 100 may encode each text token using the Byte Pair Encoding model. For example, the encoder 100 may encode the first text token 110*a* using the Byte Pair Encoding model 120*a*, and encode the second text token 110*b* using the Byte Pair Encoding model 120*b*. By using the Byte Pair Encoding model, a common pair of consecutive bytes of the first text token 110*a* may be replaced with a byte which does not occur within the first text token 110*a*. Likewise, a common pair of consecutive bytes of the second text token 110*b* may be replaced with a byte which does not occur within the second text token 110*b*.

In some embodiments, the encoder 100 may include a series of hidden layers 130. The Bi-LSTM model may operate in the hidden layers 130. For example, the encoder 100 may include a series of Bi-LSTM layers 131-135. As shown in FIG. 3, the encoder 100 may include five (5) Bi-LSTM layers 131-135, but it may be appreciated that the number of the Bi-LSTM layers is not limited thereto. In accordance with various embodiments, the plurality of hidden layers 130 may capture a latent structure of the sentence, including overall meaning of the sentence.

In some embodiments, in the first Bi-LSTM layer 131, a Bi-LSTM model 131*a* for the first text token 110*a* may read the encoded first text token 110*a* in a bidirectional manner to obtain a first forward node value and a first backward node value for the first text token 110*a*. The Bi-LSTM model 131*a* for the first text token 110*a* may then concatenate the first forward node value and the first backward node value for the first text token 110*a* together. In the first Bi-LSTM layer 131, a Bi-LSTM model 131*b* for the second text token 110*b* may read the encoded second text token 110*b* in a bidirectional manner to obtain a first forward node value and a first backward node value for the second text token 110*b*. The Bi-LSTM model 131*b* for the second text token 110*b* may then concatenate the first forward node value and the first backward node value for the second text token 110*b* together.

In some embodiments, in a second Bi-LSTM layer 132 which is a layer positioned after the first Bi-LSTM layer 131, a Bi-LSTM model 132*a* for the first text token 110*a* may read the concatenated first forward node value and first backward node value for the first text token 110*a* to obtain a second forward node value and a second backward node value for the first text token 110*a*. In the second Bi-LSTM layer 132, the Bi-LSTM model 132*a* for the first text token 110*a* may then concatenate the second forward node value and the second backward node value for the first text token 110*a* together. In the second Bi-LSTM layer 132, a Bi-LSTM model 132*b* for the second text token 110*b* may read the concatenated first forward node value and first backward node value for the second text token 110*b* in a bidirectional manner to obtain a second forward node value and a second backward node value for the second text token 110*b*. In the second Bi-LSTM layer 132, the Bi-LSTM model 132*b* for the second text token 110*b* may then concatenate the second forward node value and the second backward node value for the second text token 110*b* together.

In some embodiments, the above-described operations may be repeated until the final Bi-LSTM layer, for example, the fifth Bi-LSTM layer 135, is reached.

In some embodiments, the encoder 100 may include an output layer 140. The output layer 140 may be or include a max pooling layer which may perform a max pooling function.

The max pooling layer may be positioned after the final Bi-LSTM layer, for example, the fifth Bi-LSTM layer 135, of the hidden layers 130. In some embodiments, in the fifth Bi-LSTM layer 135, a Bi-LSTM model 135*a* for the first text token 110*a* may read the concatenated fourth forward node value and fourth backward node value for the first text token 110*a* to obtain a fifth forward node value and a fifth backward node value for the first text token 110*a* as a final forward node value and a final backward node value for the first text token 110*a*. In the fifth Bi-LSTM layer 135, a Bi-LSTM model 135*b* for the second text token 110*b* may read the concatenated fourth forward node value and fourth backward node value for the second text token 110*b* to obtain a fifth forward node value and a fifth backward node value for the second text token 110*b* as a final forward node value and a final backward node value for the second text token 110*b*.

In the fifth Bi-LSTM layer 135, the Bi-LSTM model 135*a* for the first text token 110*a* may concatenate the final forward node value and the final backward node value for the first text token 110*a* together. In the fifth Bi-LSTM layer 135, the Bi-LSTM model 135*b* for the second text token 110*b* may concatenate the final forward node value and the final backward node value for the second text token 110*b* together.

In the max pooling layer, the max pooling function may receive the concatenated final forward node value and final backward node value for the first text token 110*a* and the second text token 110*b*. The max pooling function may then split the concatenated final forward node value and the final backward node value into pieces, and take the maximum value of each piece to obtain a final value for the first text token 110*a* and a final value for the second text token 110*b*. The max pooling function may then obtain a vector including the set of final values corresponding to each text token, for example, the final value for the first text token 110*a* and the final value for the second text token 110*b*. In this regard, the encoder 100 may output the vector including the final value for the first text token 110*a* and the final value for the second text token 110*b*.

For example, if the Bi-LSTM model has 2048 nodes and the sentence embedding has 1024 dimensions, the max pooling function may divide the 2048 nodes by 1024 equal pieces each containing two (2) nodes. The max pooling function may take the maximum value output by these two (2) nodes and use the maximum value as the final value for the corresponding dimensions. For example, if the values of the first four (4) nodes are "1, 4, 3, 7", the value of the first dimension may be "4" (i.e. maximum value of 1 and 4), and the value of the second dimension may be "7" (i.e. maximum value of 3 and 7). In some embodiments, the vector may be a 1024-dimension vector. For example, the vector representing the semantic meaning of the input text may include 1024 numbers.

In some embodiments, as shown in FIG. 3, a stop token 110*m* may be used to inform the Bi-LSTM model of the end of the input text. Since the Bi-LSTM model may use a tokenized sentence, the stop token 110*m* may be used as a final token. In some embodiments, the encoder 100 may encode the stop token 110*m* representing the end of the input text using a Byte Pair Encoding model 120*m* in the input layer 120. The encoder 100 may input the encoded stop token into a Bi-LSTM model 131*m*. In this regard, the vector may also include a final value for the stop token 110*m*.

In some embodiments, decoder 200 may include a series of a Feedforward Neural Network (FFNN) layers in which a FFNN model is operated. The FFNN model may map the vector to the each sentiment score. The decoder 200 may include an input layer 221 (also referred to as "a first layer 221") and a plurality of hidden layers, for example, three (3) hidden layers 222, 223, 224 (also referred to as "a second layer 222", "a third layer 223", and "a fourth layer 224" respectively). The plurality of hidden layers 222, 223, 224 may be connected to each other. As shown in FIG. 3, the decoder 100 may include four (4) layers 221-224 for the FFNN model, for example, the first to fourth layers 221-224, but it may be appreciated that the number of layers for the FFNN model is not limited thereto. In accordance with various embodiments, the plurality of layers 221-224 may capture a latent structure of the sentence, including overall meaning of the sentence.

In the first layer 221, the decoder 200 may input the vector outputted from the encoder 100 into the FFNN model 221*a*-221*n*. For example, the vector may be the 1024-dimension vector, and the each value 210*a*-210*n* of the 1024-dimension vector may be inputted into the FFNN model 221*a*-221*n* respectively. As an example, each layer in the decoder 200 may have 1024 nodes (also referred to as "cells").

The decoder 200 may input the vector into the FFNN model in the series of hidden layers 222-224 to obtain an output. For example, the decoder 200 may use a Rectified Linear Unit (ReLU) activation function in the hidden layers 222-224. It may be appreciated that the decoder 200 may use another activation function for the output of the bidden layers 222-224. For example, the activation function may be a linear function allowing the FFNN model to learn faster.

In some embodiments, the decoder 200 may include an output layer 230. The output layer 230 may be or include a Softmax layer which may perform a Softmax function. The Softmax layer may be positioned after the final layer, for example, the fourth layer 224, of the FFNN layers. The Softmax function may generalize the output of the fourth layer 224. The decoder 200 may then input the output of the series of FFNN layers 221-224 into the Softmax function. The Softmax function in the Softmax layer may obtain the probability of the each sentiment score, and determine the sentiment score for the input text based on the probability.

In some embodiments, the FFNN model may be trained to correctly map the sentence to the correct sentiment score. The FFNN model may be trained on a synthetic data set. The training data may include the sentence embedding generated by the Bi-LSTM model of the encoder 100 and a corresponding sentiment score (for example, a sentiment score of the input text used to generate the sentence embedding).

For example, the sentiment score may have five (5) possible values from "1" (for example, representing very negative) to "5" (for example, representing very positive). Each position in the Softmax function output may represent a sentiment score, with the first position representing a score of one (1), the second position representing a score of two (2), etc. Each value in the Softmax function may represent the probability of the input text being that particular sentiment score. For example, after collecting all the output values, if the collected output values from the Softmax function are [0.01, 0.01, 0.01, 0.01, 0.96], the decoder 200 may determine that the input text may have a sentiment score of "5" with a probability of 96%.

As described above, in accordance of various embodiments, the system 1000 may generate a polarity score, as opposed to a binary positive/negative score, for the sentiment of the user's feedback. Having the ability to generate the sentiment score for the user's feedback may provide a number of strategic advantages. The sentiment score outputted from the system 1000 may be used for various use cases as follows, but not be limited thereto.

High-level strategic decision making:

The sentiment scores of the system 1000 in accordance with various embodiments may be used in a research for a company's strategy. The research may influence the company's product strategy as sentiment score may be used to determine which projects should be prioritized and worked on by assessing volume and severity of user pain points.

The share of negative feedback (for example, the number of total feedback divided by the number of negative feedback) may be a metric that may be used as objectives and key results.

Product-related:

The sentiment scores may be used as an experimental guardrail metric. When experiments are conducted, the sentiment scores may be used to ensure that new product features may not cause a degraded user experience.

The sentiment scores may be used in retrospective analysis to diagnose faults within existing product rollouts.

Miscellaneous:

The sentiment scores may be used as inputs to model and predict how likely a user is to churn, and the future lifetime value of the user.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A system for recognizing a sentiment of a user's feedback comprising:

an encoder configured to receive an input text for the user's feedback, break up the input text into text tokens, and encode each text token including a stop token using a byte pair encoding model; and a decoder connected to the encoder and configured to output a sentiment score for the input text, wherein the encoder is further configured to read the encoded text token in a bidirectional manner to obtain a forward node value and a backward node value, and concatenate the forward node value and the backward node value together to obtain a vector representing semantic meaning of the input text, and the decoder is configured to receive the vector from the encoder, obtain a probability of each sentiment score by mapping the vector into each sentiment score, and determine the sentiment score for the input text based on the probability.

2. The system according to claim 1, wherein the input text relates to a sentence, and the encoder is configured to break up the input text into the text tokens each corresponding to a plurality of words included in the sentence.

3. The system according to claim 1, wherein the encoder is further configured to input the encoded text token into a Bidirectional Long Short-Term Memory Network (Bi-LSTM) model configured to read the encoded text token in the bidirectional manner.

4. The system according to claim 3, wherein the encoder comprises a series of Bi-LSTM layers in which the Bi-LSTM model is operated, in a first Bi-LSTM layer of the Bi-LSTM layers, the encoder is configured to input the encoded text token into the Bi-LSTM model, and the Bi-LSTM model is configured to obtain a first forward node value and a first backward node value and concatenate the first forward node value and the first backward node value together, and in a next Bi-LSTM layer of the Bi-LSTM layers, the encoder is configured to input the concatenated first forward node value and first backward node value into the Bi-LSTM model, and the Bi-LSTM model is configured to obtain a next forward node value and a next backward node value and concatenate the next forward node value and the next backward node value together.

5. The system according to claim 4, wherein the encoder comprises a max pooling layer in which a max pooling function is operated, in a final Bi-LSTM layer of the Bi-LSTM layers, the Bi-LSTM model is configured to obtain a final forward node value and a final backward node value, and concatenate the final forward node value and the final backward node value together, and in the max pooling layer, the max pooling function is configured to process the concatenated final forward node value and final backward node value to obtain the vector.

6. The system according to claim 3, wherein the encoder is further configured to encode the each text token using a Byte Pair Encoding model.

7. The system according to claim 6, wherein the encoder is further configured to encode a stop token representing an end of the input text using the Byte Pair Encoding model, and input the encoded stop token into the Bi-LSTM model.

8. The system according to claim 1, wherein the decoder is configured to input the vector into a Feedforward Neural Network (FFNN) model configured to map the vector to the each sentiment score.

9. The system according to claim 8, wherein the decoder comprises a series of FFNN layers in which the FFNN model is operated, and a Softmax layer in which a Softmax function is operated, the decoder is configured to input the vector into the FFNN model in the series of FFNN layers to obtain an output, and input the output of the FFNN model into the Softmax function, and the Softmax function is configured to obtain the probability of the each sentiment score and determine the sentiment score for the input text based on the probability.

10. A method of recognizing a sentiment of a user's feedback, the method comprising: receiving an input text for the user's feedback;

breaking up the input text into text tokens;

encoding each text token including a stop token using a byte pair encoding model;

reading the encoded text token in a bidirectional manner to obtain a forward node value and a backward node value;

concatenating the forward node value and the backward node value together to obtain a vector representing semantic meaning of the input text, obtaining a probability of each sentiment score by mapping the vector into each sentiment score; and determining a sentiment score for the input text based on the probability.

11. The method according to claim 10, wherein the input text relates to a sentence, and breaking up the input text into text tokens comprises:

breaking up the input text into the text tokens each corresponding to a plurality of words included in the sentence.

12. The method according to claim 10, wherein reading the encoded text token in a bidirectional manner to obtain a forward node value and a backward node value comprises:

inputting the encoded text token into a Bidirectional Long Short-Term Memory Network (Bi-LSTM) model configured to read the encoded text token in the bidirectional manner.

13. The method according to claim 12, wherein the Bi-LSTM model is operated in a series of Bi-LSTM layers, reading the encoded text token in a bidirectional manner to obtain a forward node value and a backward node value comprises:

inputting the encoded text token into the Bi-LSTM model in a first Bi-LSTM layer of the Bi-LSTM layers;

obtaining a first forward node value and a first backward node value;

concatenating the first forward node value and the first backward node value together;

inputting the concatenated first forward node value and first backward node value into the Bi-LSTM model in a next Bi-LSTM layer of the Bi-LSTM layers;

obtaining a next forward node value and a next backward node value; and concatenating the next forward node value and the next backward node value together.

14. The method according to claim 13, wherein a max pooling function is operated in a max pooling layer, and reading the encoded text token in a bidirectional manner to obtain a forward node value and a backward node value further comprises:

obtaining a final forward node value and a final backward node value in a final Bi-LSTM layer of the Bi-LSTM layers;

concatenating the final forward node value and the final backward node value together in the final Bi-LSTM layer of the Bi-LSTM layers;

processing the concatenated final forward node value and final backward node value in the max pooling layer; and obtaining the vector in the max pooling layer.

15. The method according to claim 12, wherein encoding each text token comprises:

encoding the each text token using a Byte Pair Encoding model.

16. The method according to claim 15 further comprising:

encoding a stop token representing an end of the input text using the Byte Pair Encoding model; and inputting the encoded stop token into the Bi-LSTM model.

17. The method according to claim 10, wherein obtaining a probability of each sentiment score by mapping the vector into each sentiment score comprises:

inputting the vector into a Feedforward Neural Network (FFNN) model configured to map the vector to the each sentiment score.

18. The method according to claim 17, wherein the FFNN model is operated in a series of FFNN layers, and a Softmax function is operated in a Softmax layer, obtaining a probability of each sentiment score by mapping the vector into each sentiment score comprises:

inputting the vector into the FFNN model to obtain an output in the series of FFNN layers;

inputting the output of the FFNN model into the Softmax function in the Softmax layer;

obtaining the probability of the each sentiment score in the Softmax layer; and determining the sentiment score for the input text based on the probability in the Softmax layer.

19. A data processing apparatus configured to perform the method of claim 10.

20. A non-transitory computer program element comprising program instructions, which, when executed by one or more processors, cause the one or more processors to perform the method of claim 10.

* * * * *